(12) United States Patent
Schumacher

(10) Patent No.: US 8,128,136 B2
(45) Date of Patent: Mar. 6, 2012

(54) CLOSING DEVICE FOR A MOVABLE ROOF

(75) Inventor: Thorsten Schumacher, Kummerfeld (DE)

(73) Assignee: Magna Car Top Systems GmbH, Bietigheim-Bissingen (DE)

( * ) Notice: Subject to any disclaimer, the term of this patent is extended or adjusted under 35 U.S.C. 154(b) by 516 days.

(21) Appl. No.: 12/393,360

(22) Filed: Feb. 26, 2009

(65) Prior Publication Data

US 2009/0218828 A1 Sep. 3, 2009

(30) Foreign Application Priority Data

Feb. 28, 2008 (DE) .......................... 10 2008 011 587

(51) Int. Cl.
  *E05C 3/06* (2006.01)
(52) U.S. Cl. .................. 292/217; 292/DIG. 5; 296/224; 296/221; 296/108; 296/107.09
(58) Field of Classification Search .................. 292/217, 292/DIG. 5, 216, 198, 200; 296/221.02, 296/221, 224, 108 X, 107.09 X, 107.11, 107.16, 296/218, 76
See application file for complete search history.

(56) References Cited

U.S. PATENT DOCUMENTS

| 5,413,390 A * | 5/1995 | Filippi ............................. 292/96 |
| 6,834,907 B2 * | 12/2004 | Dietl ............................. 296/121 |
| 2008/0309117 A1 | 12/2008 | Habacker |

FOREIGN PATENT DOCUMENTS

| DE | 199 35 738 A1 | 2/2001 |
| DE | 101 05 771 A1 | 9/2002 |
| DE | 10 2004 046 602 A1 | 4/2006 |
| DE | 10 2005 018 201 A1 | 10/2006 |
| EP | 1 053 900 A2 | 11/2000 |
| EP | 1 529 908 A2 | 5/2005 |

\* cited by examiner

*Primary Examiner* — Carlos Lugo
*Assistant Examiner* — Mark Williams
(74) *Attorney, Agent, or Firm* — Brooks Kushman P.C.

(57) ABSTRACT

A closing device for locking and unlocking a movable roof to and from a vehicle body includes a hook and a lever system. The hook is movable between a closed position to engage a vehicle body component and an opened position to disengage from the component. The lever system has a hook lever and a drive lever pivotable about respective pivot axes extending in a longitudinal direction. The hook is connected to the hook lever to move between the closed and opened positions in response to the hook lever pivoting. The lever system has a control lever with first and second end portions and a middle section. The end portions are respectively connected to the hook lever at first and second link axes extending in the longitudinal direction and adjacent to the pivot axes to couple the hook lever and the drive lever together.

14 Claims, 6 Drawing Sheets

CLOSING DEVICE FOR A MOVABLE ROOF

CROSS-REFERENCE TO RELATED APPLICATIONS

This application claims foreign priority benefits under 35 U.S.C. §119(a)-(d) to DE 10 2008 011 587.8, filed Feb. 28, 2008, which is hereby incorporated by reference in its entirety.

BACKGROUND OF THE INVENTION

1. Field of the Invention

The present invention relates to a closing device for a movable roof of a vehicle.

2. Background Art

DE 102 05 114 B4 describes a locking device for a folding top of a vehicle. The locking device includes a hook pivotably mounted on a front portion of the folding top. The locking device is movable as part of a multi-bar linkage by a drive mechanism from an opened position into a closed position. In the closed position, the hook engages a locking catch mounted on the vehicle body.

DE 10 2004 046 602 A1 describes a movable roof supportable in a closed position on a vehicle windshield frame by a movable engaging element and an actuating element. The actuating element transmits an actuating force through a force transmitting element that reaches out in the transverse vehicle direction with a component connected to the engaging element.

EP 1 053 900 A2 describes a closing device that acts between the vehicle body and a folding top. The closing device has two lateral closure elements each having a hook piece that cooperates with a counter bearing through a hook segment in the closed position. The hook piece is connected through a shaft with an actuating lever, which can be influenced by an actuator and a drive linkage.

SUMMARY OF THE INVENTION

An object of the present invention includes a closing device for a movable roof of a vehicle in which the closing device features secure functionality and can ideally be integrated into a given movable roof design.

In carrying out the above object and other objects, the present invention provides a closing device for a movable roof of a vehicle. The closing device includes a hook and a lever system. The hook is movable between a closed position in which the hook is operable to engage a pin of a vehicle body to thereby lock the closing device to the vehicle body and an opened position in which the hook is operable to disengage from the pin to thereby unlock the closing device from the vehicle body. The lever system has a hook lever pivotable about a first pivot axis extending in a longitudinal direction. The hook lever is connected to the hook to move the hook between the closed and opened positions in response to the hook lever being pivoted about the first pivot axis. The lever system further has a drive lever pivotable about a second pivot axis extending in the longitudinal direction and offset from the first pivot axis. The lever system further has a control lever assembly having a control lever with first and second end portions and a middle section. The first end portion is connected to the hook lever at a first link axis which extends in the longitudinal direction and is adjacent to the first pivot axis and the second end portion is connected to the drive lever at a second link axis which extends in the longitudinal direction and is adjacent to the second pivot axis to thereby couple the hook lever and the drive lever together.

A closing device in accordance with embodiments of the present invention operates between a movable roof and a vehicle body in order to lock and unlock the roof to and from the vehicle body. The closing device includes a closing hook and a lever system for moving the closing hook between closed and opened positions. The lever system is formed from a closing hook lever, a drive lever, and a control lever assembly which results in the closing device being functionally advantageous and structurally well-arranged. In the closed position of the closing hook, the lever system assumes a position above top dead center whereby the closing hook is ideally secured in the closed position even in the face of high stresses such as which may be caused by a disaster. The arrangement and design of the closing hook lever, the drive lever, and the control lever assembly enable an exemplary introduction of force in a four-bar linkage formed by these components. In order to produce the position above top dead center using simple means, a support pin is on the drive lever. The support pin abuts against a support section of the control lever assembly when the closing hook is in the closed position. For this purpose, an easily formed indentation is on the control lever assembly, and the control lever assembly has two control levers respectively arranged on both sides of the closing hook lever and the drive lever. One or more relatively inexpensive contact-less sensors may be arranged to determine the location of the closed and opened positions of the closing hook.

The above features, and other features and advantages of the present invention are readily apparent from the following detailed descriptions thereof when taken in connection with the accompanying drawings.

DETAILED DESCRIPTION OF THE PREFERRED EMBODIMENT(S)

Figure 1:
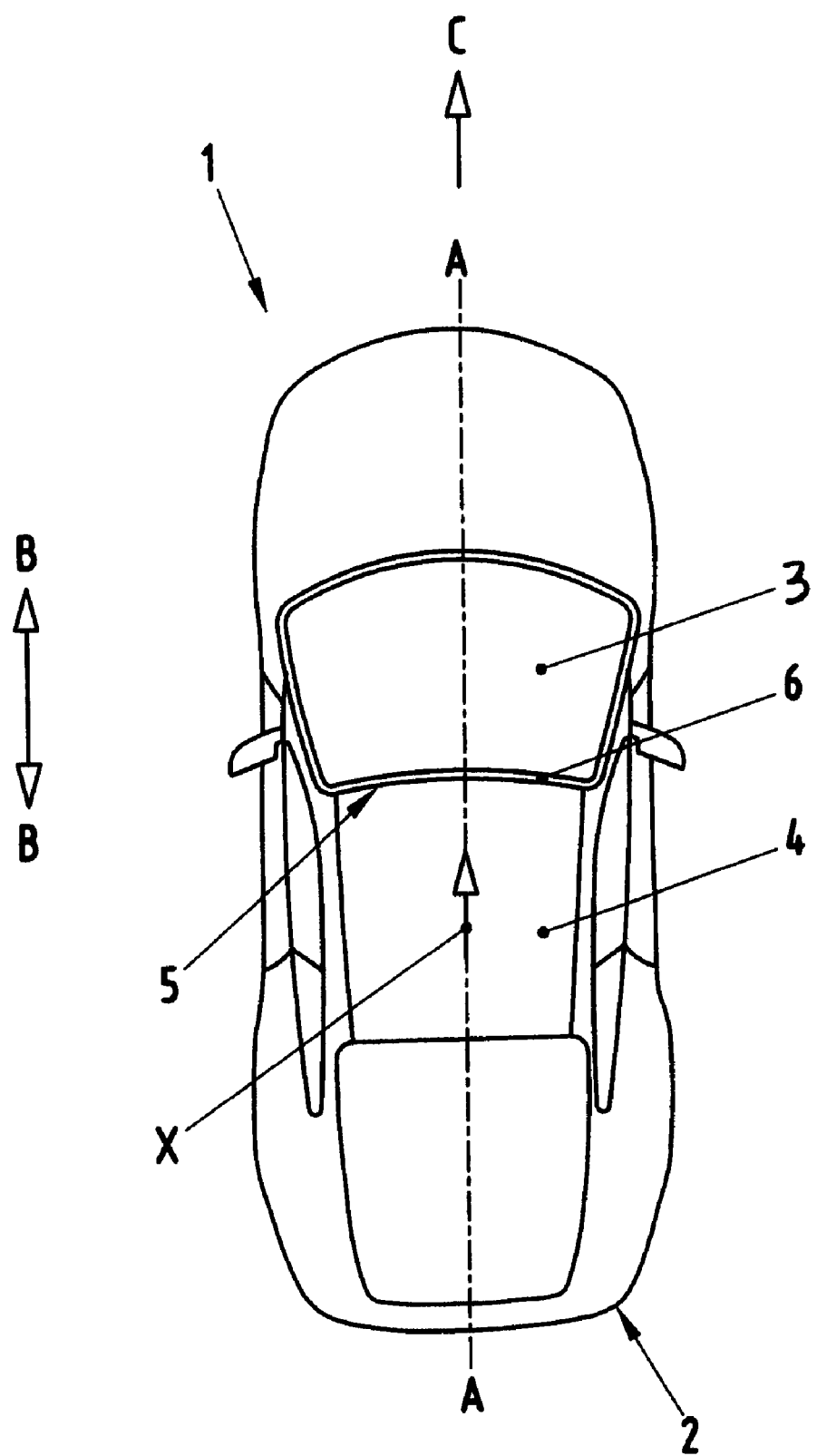
FIG. 1 illustrates a top view of a vehicle having a movable roof.

Referring now to FIG. 1, a top view of a vehicle 1 having a movable roof 4 is shown. Roof 4 is movably connected to vehicle body 2 to move between an extended position in which roof 4 is extended over the passenger compartment of vehicle body 2 and a folded position in which roof 4 is retracted into a rear storage compartment of vehicle body 2. Vehicle body 2 includes a windshield 3 within a windshield frame 5. Windshield frame 5 includes an upper cross-member 6. A front portion of roof 4 meets upper cross-member 6 when roof 4 is in its extended position.

Figure 2:
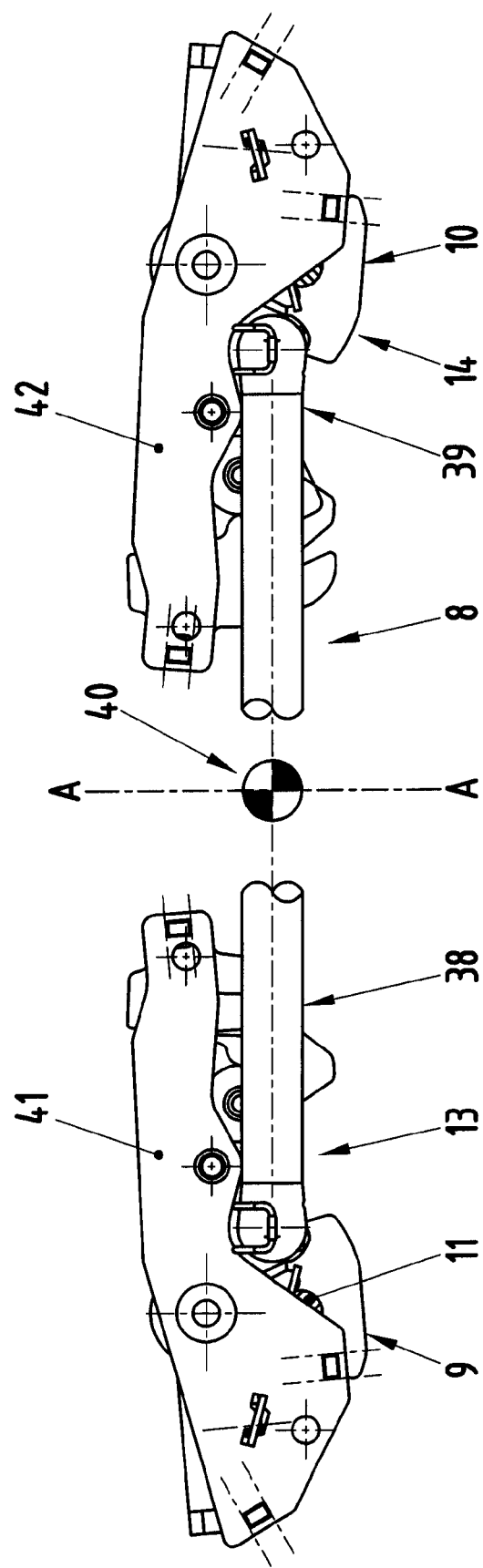
FIG. 2 illustrates a closing device for the movable roof in accordance with an embodiment of the present invention in which the closing device includes a left closing device portion having a left closing hook and a right closing device portion having a right closing hook with the closing device being shown in the direction of the arrow X of FIG. 1.

Referring now to FIG. 2, with continual reference to FIG. 1, a closing device 8 for roof 4 in accordance with an embodiment of the present invention is shown. Closing device 8 is shown in FIG. 2 in the direction of the arrow X of FIG. 1. Closing device 8 is connected to the front portion of roof 4. Closing device 8 acts between the front portion of roof 4 and upper cross-member 6. In general, closing device 8 is operable to engage with a vehicle body component in order to lock roof 4 in its extended position and to disengage from the vehicle body component in order to unlock roof 4 such that roof 4 may move from the extended to the folded position.

Closing device 8 includes a left closing device portion and a right closing device portion which are located on respective sides of a longitudinal center plane A-A of vehicle body 2. The left closing device portion includes a left closing hook 9 and a lever system 13. The right closing device portion includes a right closing hook 10 and a lever system 14. Lever system 13 is actuable to move closing hook 9 between a closed position Schst and an opened position Ost. In the closed position Schst, closing hook 9 engages a vehicle body closing pin 11, extending along one longitudinal side of vehicle body 2 along a portion of the longitudinal vehicle direction B-B in the direction of forward vehicle travel C, to lock roof 4 to closing pin 11. In the opened position Ost, closing hook 9 disengages from closing pin 11 to unlock roof 4 from closing pin 11. Similarly, lever system 14 is actuable to move closing hook 10 between a closed position in which closing hook 10 engages a vehicle body closing pin extending along the other longitudinal side of vehicle body 2 and an opened position Ost in which closing hook 10 disengages from this closing pin.

The left and right closing device portions include the same type of components and function the same way. In particular, closing hooks 9, 10 and lever systems 13, 14 are formed essentially by the same components. As such, only the left closing device portion is described and illustrated in greater detail herein.

Figure 3:
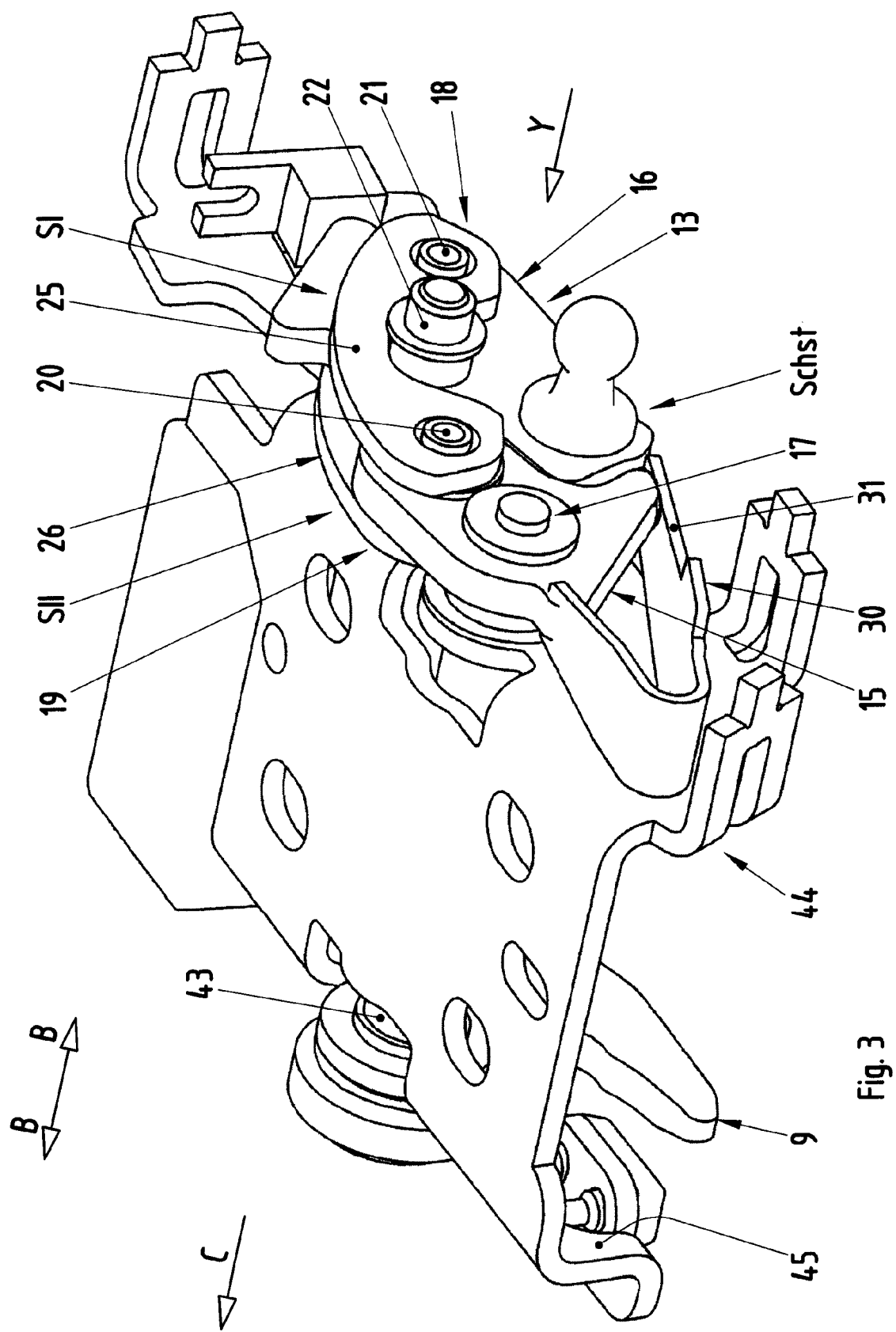
FIG. 3 illustrates an oblique view of the left closing device portion from the rear and above with the left closing hook being in a closed position.
Figure 4:
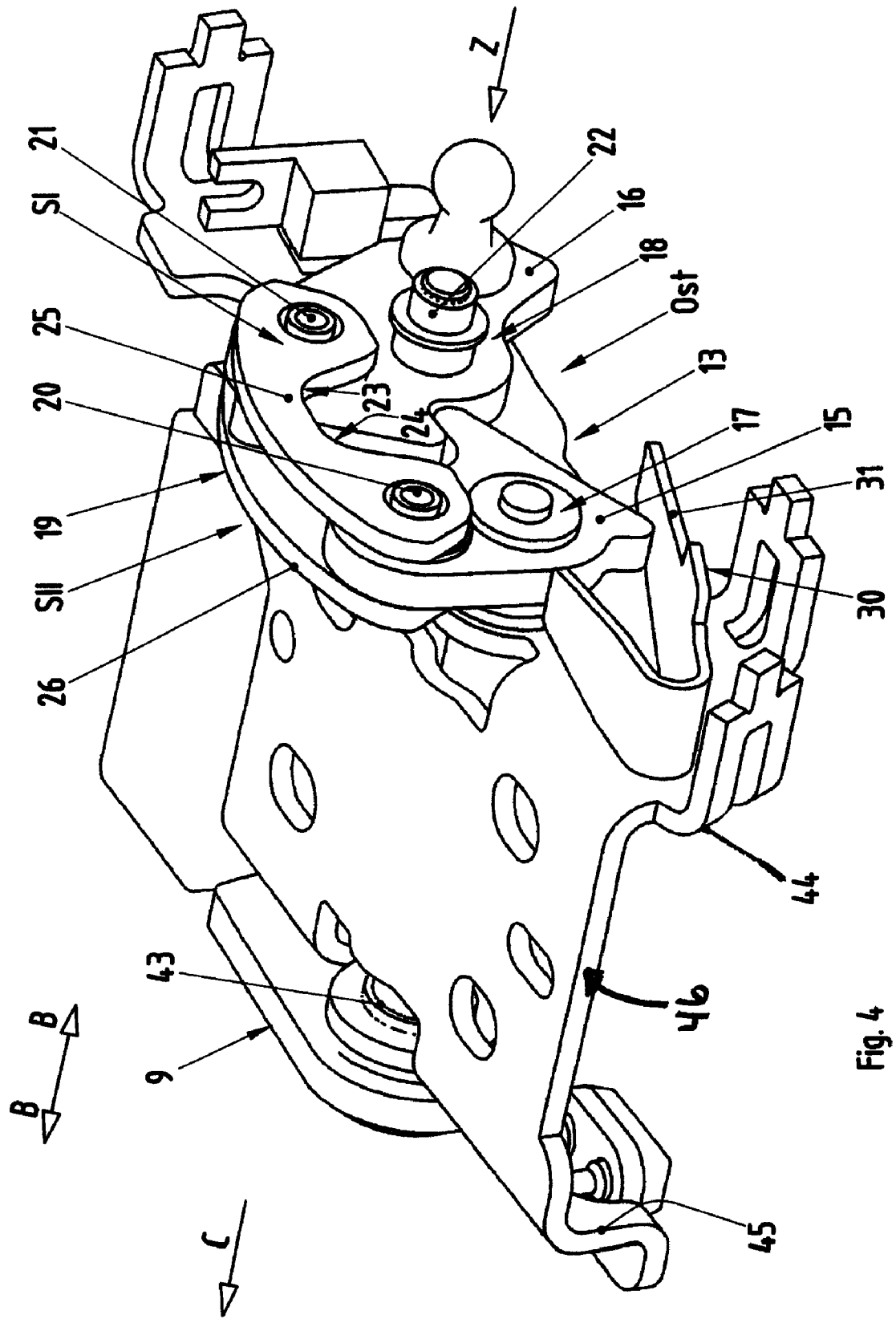
FIG. 4 illustrates an oblique view of the left closing device portion from the rear and above with the left closing hook being in an opened position.
Figure 5:
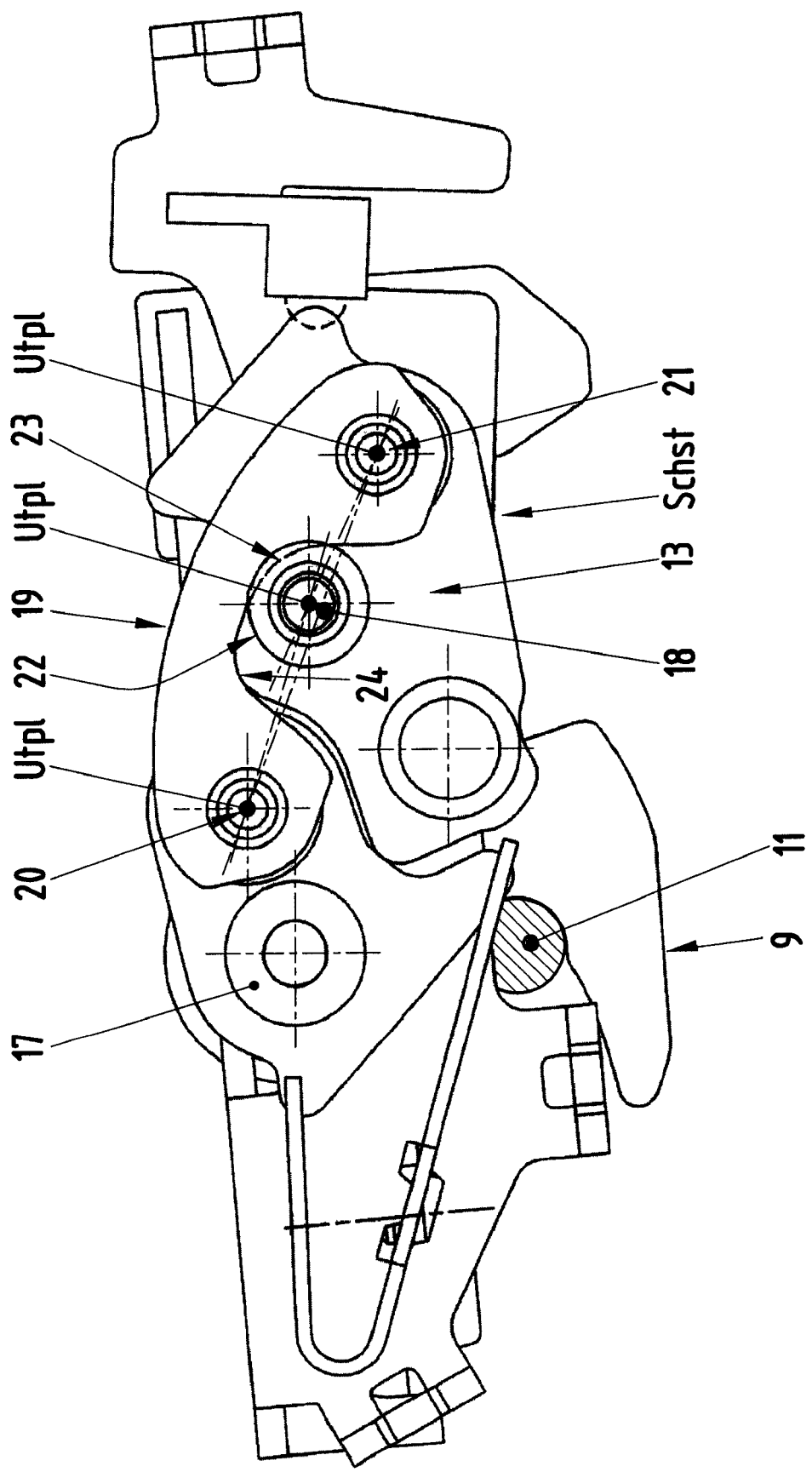
FIG. 5 illustrates a view of the left closing device portion in the direction of arrow Y of FIG. 3 with the left closing hook being in the closed position.
Figure 6:
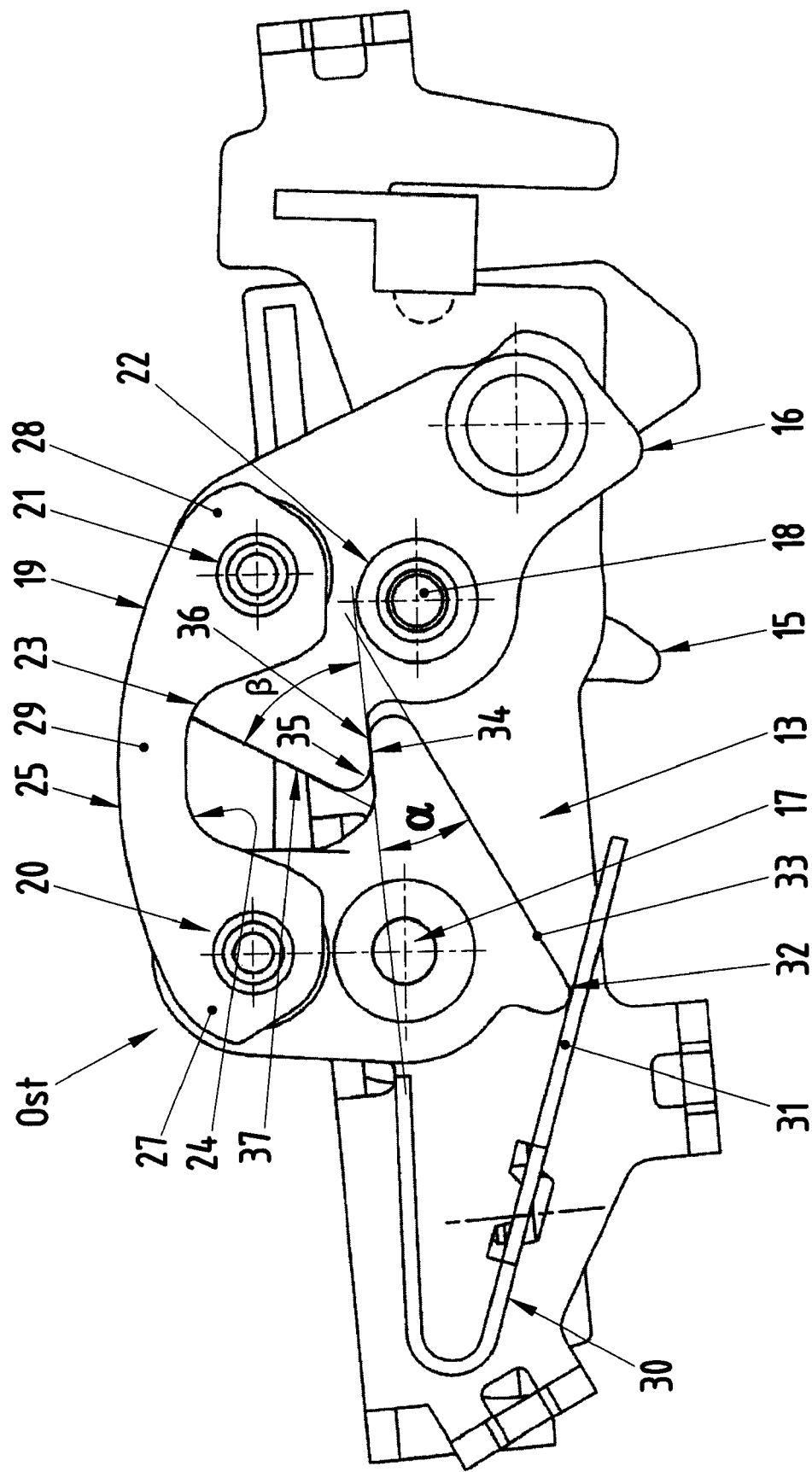
FIG. 6 illustrates a view of the left closing device portion in the direction of arrow Z of FIG. 4 with the left closing hook being in the opened position.

Referring now to FIGS. 3, 4, 5, and 6, with continual reference to FIGS. 1 and 2, views of the left closing device portion of closing device 8 are shown. FIGS. 3 and 4 illustrate oblique views of the left closing device portion from the rear and above. In FIG. 3, closing hook 9 is in the closed position Schst. In FIG. 4, closing hook 9 is in the opened position Ost. FIG. 5 illustrates a view of the left closing device portion in the direction of arrow Y of FIG. 3 with closing hook 9 being in the closed position Schst. FIG. 6 illustrates a view of the left closing device portion in the direction of arrow Z of FIG. 4 with closing hook 9 being in the opened position Ost.

Lever system 13 for closing hook 9 includes a closing hook lever 15 and a drive lever 16. Closing hook lever 15 is mounted on a first pivot axis 17. Drive lever 16 is mounted on a second pivot axis 18. First and second pivot axes 17, 18 are both oriented in the longitudinal vehicle direction B-B at a distance from one another. A control lever assembly 19 is connected with closing hook lever 15 at a first link axis 20 and is connected with drive lever 16 at a second link axis 21. As a result, closing hook lever 15 and drive lever 16 are coupled to one another through control lever assembly 19.

A support pin 22 is affixed on drive lever 16 at a distance from link axes 20, 21 of control lever assembly 19. Support pin 22 produces a position Utpl above top dead center (FIG. 5) of lever system 13 in the closed position Schst of closing hook 9, together with a support section 23 of control lever assembly 19 and first and second link axes 20, 21. Support section 23 of control lever assembly 19 is on an indentation 24 of control lever assembly 19.

Control lever assembly 19 is formed by two identical control levers 25 and 26 (FIG. 3). Control levers 25, 26 are arranged on respective sides SI and SII of closing hook lever 15 and drive lever 16. Each control lever 25, 26 includes respective bearing lugs 27, 28 for offset link axes 20, 21 and a middle piece 29 connecting bearing lugs 27, 28. Indentation 24 with support section 23 is incorporated in middle piece 29. Middle piece 29 and bearing lugs 27, 28 are made symmetrically and give the corresponding control lever 25 the shape of a pair of eyeglasses.

A spring 30 such as a leaf spring 31 engages lever system 13. Leaf spring 31 attempts to move lever system 13 with closing hook 9 into the opened position Ost. Leaf spring 31 acts on closing hook lever 15 in the embodiment. To this end, closing hook lever 15 has a first cam type section 32, a first cam track section 33, and a second cam track section 34. Leaf spring 31 cooperates with first cam track section 33.

Drive lever 16 includes a second cam type section 35 with a first cam track section 36 and a second cam track section 37. In the opened position of closing hook 9 (FIG. 6), a first cam track section 36 of second cam type section 35 abuts against second cam track section 34 of first cam type section 32. First cam track section 33 and second cam track section 34 of first cam type section 32 include an angle $\alpha$ of approximately 22°. First cam track section 36 and second cam track section 37 of second cam type section 35 include an angle $\beta$ of approximately 56°.

With reference to FIG. 2, left closing hook 9 and right closing hook 10, and/or lever systems 13 and 14, are actuated through connecting rods 38 and 39 which are attached to drive levers 16 and to an adjusting mechanism 40. Adjusting mechanism 40 can be of the manual or power-operated type.

Sole plates 41 and 42 are used to respectively mount lever systems 13, 14. A connecting shaft 43 is used for coupling closing hook 9 with closing hook lever 15. Connecting shaft 43 extends in the longitudinal vehicle direction A-A and is held on legs 44 and 45 of a sole plate 46 having an approximately U-shaped cross-sectional profile.

The closed position Schst and the opened position Ost of closing hooks 9, 10 and/or lever systems 13, 14 are detected by contact-less sensors such as Hall effect transducers.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A closing device for a movable roof of a vehicle, the closing device comprising:
   a hook movable between a closed position in which the hook is operable to engage a pin of a vehicle body to thereby lock the closing device to the vehicle body and an opened position in which the hook is operable to disengage from the pin to thereby unlock the closing device from the vehicle body; and
   a lever system having a hook lever pivotable about a first pivot axis extending in a longitudinal direction, the hook lever connected to the hook to move the hook between the closed and opened positions in response to the hook lever being pivoted about the first pivot axis;

the lever system further having a drive lever pivotable about a second pivot axis extending in the longitudinal direction and offset from the first pivot axis;

the lever system further having a control lever assembly having a control lever with first and second end portions and a middle section, wherein the first end portion of the control lever is rotatably connected to the hook lever at a first link axis which extends in the longitudinal direction and is adjacent to the first pivot axis and the second end portion of the control lever is rotatably connected to the drive lever at a second link axis which extends in the longitudinal direction and is adjacent to the second pivot axis to thereby couple the hook lever and the drive lever together;

wherein the drive lever includes a support pin affixed thereon and the middle section of the control lever forms an indentation between the end portions of the control lever, wherein the support pin of the drive lever abuts against the indentation of the control lever between the end portions of the control lever when the hook is in the closed position such that the lever system assumes a position above top dead center when the hook is in the closed position.

2. The closing device of claim 1 wherein:

the control lever assembly further includes a second control lever with first and second end portions and a middle section, wherein the first end portion of the second control lever is connected to the hook lever at the first link axis and the second end portion of the second control lever is connected to the drive lever at the second link axis to thereby couple the hook lever and the drive lever together;

wherein the control levers are on respective sides of the hook lever and the drive lever in the longitudinal direction.

3. The closing device of claim 2 wherein:

each end portion of each control lever includes a bearing lug.

4. The closing device of claim 1 further comprising:

a spring, wherein the spring engages the hook lever and is biased to pivot the hook lever about the first pivot axis to move the hook into the opened position.

5. The closing device of claim 4 wherein:

the spring is a leaf spring.

6. The closing device of claim 1 wherein:

the hook lever is connected to the hook through a connecting shaft extending in the longitudinal direction.

7. The closing device of claim 1 wherein the hook is a first hook and the lever system is a first lever system, the closing device further comprising:

a second hook and a second lever system;

wherein the first hook and the first lever system are on a side of a longitudinal plane and the second hook and the second lever system are on an opposite side of the longitudinal plane.

8. The closing device of claim 7 wherein:

the first and second lever systems consist of the same type of components.

9. A closing device for a movable roof of a vehicle, the closing device comprising:

a hook movable between a closed position in which the hook is operable to engage a pin of a vehicle body to thereby lock the closing device to the vehicle body and an opened position in which the hook is operable to disengage from the pin to thereby unlock the closing device from the vehicle body;

a lever system having a hook lever pivotable about a first pivot axis extending in a longitudinal direction, the hook lever connected to the hook to move the hook between the closed and opened positions in response to the hook lever being pivoted about the first pivot axis;

the lever system further having a drive lever pivotable about a second pivot axis extending in the longitudinal direction and offset from the first pivot axis;

the lever system further having a control lever assembly having a control lever with first and second end portions and a middle section, wherein the first end portion of the control lever is rotatably connected to the hook lever at a first link axis which extends in the longitudinal direction and is adjacent to the first pivot axis and the second end portion of the control lever is rotatably connected to the drive lever at a second link axis which extends in the longitudinal direction and is adjacent to the second pivot axis to thereby couple the hook lever and the drive lever together; and a leaf spring;

wherein the hook lever has a first cam type section with a first cam track section and a second cam track section;

wherein the drive lever has a second cam type section with a first cam track section;

wherein when the hook is in the closed position the leaf spring engages the first cam track section of the first cam type section of the hook lever and is biased to pivot the hook lever about the first pivot axis to move the hook into the opened position;

wherein when the hook is in the opened position the first cam track section of the second cam type section abuts against the second cam track section of the first cam type section.

10. The closing device of claim 9 wherein:

the control lever assembly further includes a second control lever with first and second end portions and a middle section, wherein the first end portion of the second control lever is connected to the hook lever at the first link axis and the second end portion of the second control lever is connected to the drive lever at the second link axis to thereby couple the hook lever and the drive lever together;

wherein the control levers are on respective sides of the hook lever and the drive lever in the longitudinal direction.

11. The closing device of claim 10 wherein:

each end portion of each control lever includes a bearing lug.

12. The closing device of claim 9 wherein:

the hook lever is connected to the hook through a connecting shaft extending in the longitudinal direction.

13. The closing device of claim 9 wherein the hook is a first hook and the lever system is a first lever system, the closing device further comprising:

a second hook and a second lever system;

wherein the first hook and the first lever system are on a side of a longitudinal plane and the second hook and the second lever system are on an opposite side of the longitudinal plane.

14. The closing device of claim 13 wherein:

the first and second lever systems consist of the same type of components.

* * * * *